(12) United States Patent
Fry et al.

(10) Patent No.: US 8,001,497 B2
(45) Date of Patent: Aug. 16, 2011

(54) CONTROL SIGNAL SOURCE REPLICATION

(75) Inventors: Randall P. Fry, Greenville, NC (US);
Balamurugan Balasubramanian, San Jose, CA (US); Kavitha Chaturvedula, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 514 days.

(21) Appl. No.: 12/243,768

(22) Filed: Oct. 1, 2008

(65) Prior Publication Data

US 2010/0083195 A1   Apr. 1, 2010

(51) Int. Cl.
*G06F 17/50* (2006.01)
*G06F 9/455* (2006.01)
*G06F 11/22* (2006.01)

(52) U.S. Cl. .................. 716/101; 716/116; 716/136

(58) Field of Classification Search ............ 716/101, 716/104, 116, 132, 134, 136–138
See application file for complete search history.

(56) References Cited

U.S. PATENT DOCUMENTS

| 7,082,584 | B2 | | 7/2006 | Lahner et al. | |
| 7,086,015 | B2 | * | 8/2006 | Lahner et al. | 716/102 |
| 7,111,274 | B1 | * | 9/2006 | Edwards et al. | 716/103 |
| 7,594,201 | B2 | * | 9/2009 | Lahner et al. | 716/132 |
| 2007/0168902 | A1 | * | 7/2007 | Ogawa et al. | 716/18 |
| 2008/0092103 | A1 | * | 4/2008 | Aoyama | 716/18 |
| 2008/0301601 | A1 | * | 12/2008 | Ng et al. | 716/5 |
| 2008/0313578 | A1 | * | 12/2008 | Maixner et al. | 716/3 |
| 2009/0300564 | A1 | * | 12/2009 | Kanazawa | 716/5 |

* cited by examiner

*Primary Examiner* — Stacy A Whitmore
(74) *Attorney, Agent, or Firm* — Alexander J. Neudeck; Cochran Freund & Young LLC

(57) ABSTRACT

Disclosed is a method of replicating control signal sources, comprising: receiving a description of a functional block that comprises at least one of, a plurality of multiplexer structures, a plurality of memory blocks, and a combination of at least one multiplexer structure and at least one memory block; identifying a control signal that controls said at least one of, said plurality of multiplexer structures, said plurality of memory blocks, and said combination of at least one multiplexer structure and at least one memory block; and, determining a first replica control signal and a second replica control signal, said first replica control signal and said second replica control signal collectively functioning as said control signal to control said at least one of, said plurality of multiplexer structures, said plurality of memory blocks, and said combination of at least one multiplexer structure and at least one memory block.

20 Claims, 4 Drawing Sheets

US 8,001,497 B2

CONTROL SIGNAL SOURCE REPLICATION

BACKGROUND OF THE INVENTION

Electronic design automation (EDA) is a category of tools that facilitate the design of complex electronic systems such as integrated circuits. Over the years, EDA tools have become increasingly complex. EDA tools have evolved from simple circuit simulators such as SPICE to include most aspects of logic design, layout, and verification. One aspect of integrated circuit design that is now encompassed by EDA tools is the synthesis of large portions (or entire) application specific integrated circuits (ASICs) from higher level behavioral models such as Verilog and VHDL. This synthesis process generates design implementations in terms of logic gates from higher level behavioral models. Another aspect involves the automated analysis of both physical and logical (e.g., schematic or VHDL) designs to detect timing, loading, power, and/or reliability problems.

SUMMARY OF THE INVENTION

An embodiment of the invention may therefore comprise a method of replicating control signal sources, comprising: receiving a description of a functional block that comprises at least one of, a plurality of multiplexer structures, a plurality of memory blocks, and a combination of at least one multiplexer structure and at least one memory block; identifying a control signal that controls said at least one of, said plurality of multiplexer structures, said plurality of memory blocks, and said combination of at least one multiplexer structure and at least one memory block; and, determining a first replica control signal and a second replica control signal, said first replica control signal and said second replica control signal collectively functioning as said control signal to control said at least one of, said plurality of multiplexer structures, said plurality of memory blocks, and said combination of at least one multiplexer structure and at least one memory block.

An embodiment of the invention may therefore further comprise a method of reducing congestion and improving timing of a control signal, comprising: receiving a description of a functional block; detecting, in said functional block, a memory block that is controlled by said control signal; detecting, in said functional block, a multiplexer structure that is controlled by said control signal; detecting that said memory block and said multiplexer structure are both controlled by said control signal; determining a plurality of replica control sources comprising a first replica control source and a second replica control source; and, determining an assignment of said plurality of replica control sources to said memory block and said multiplexer structure comprising assigning said first replica control source to control said memory block and assigning said second replica control source to control said multiplexer structure.

An embodiment of the invention may therefore further comprise a computer readable medium having instructions stored thereon for replicating a control signal that, when executed by a computer, at least direct the computer to: receive a description of a functional block that comprises at least one multiplexer structure and at least one memory block; identify a control signal that controls said at least one multiplexer structure and said at least one memory block; and, determine a first replica control signal and a second replica control signal, said first replica control signal and said second replica control signal collectively functioning as said control signal to control said at least one multiplexer structure and said at least one memory block.

DETAILED DESCRIPTION OF THE EMBODIMENTS

Figure 1:
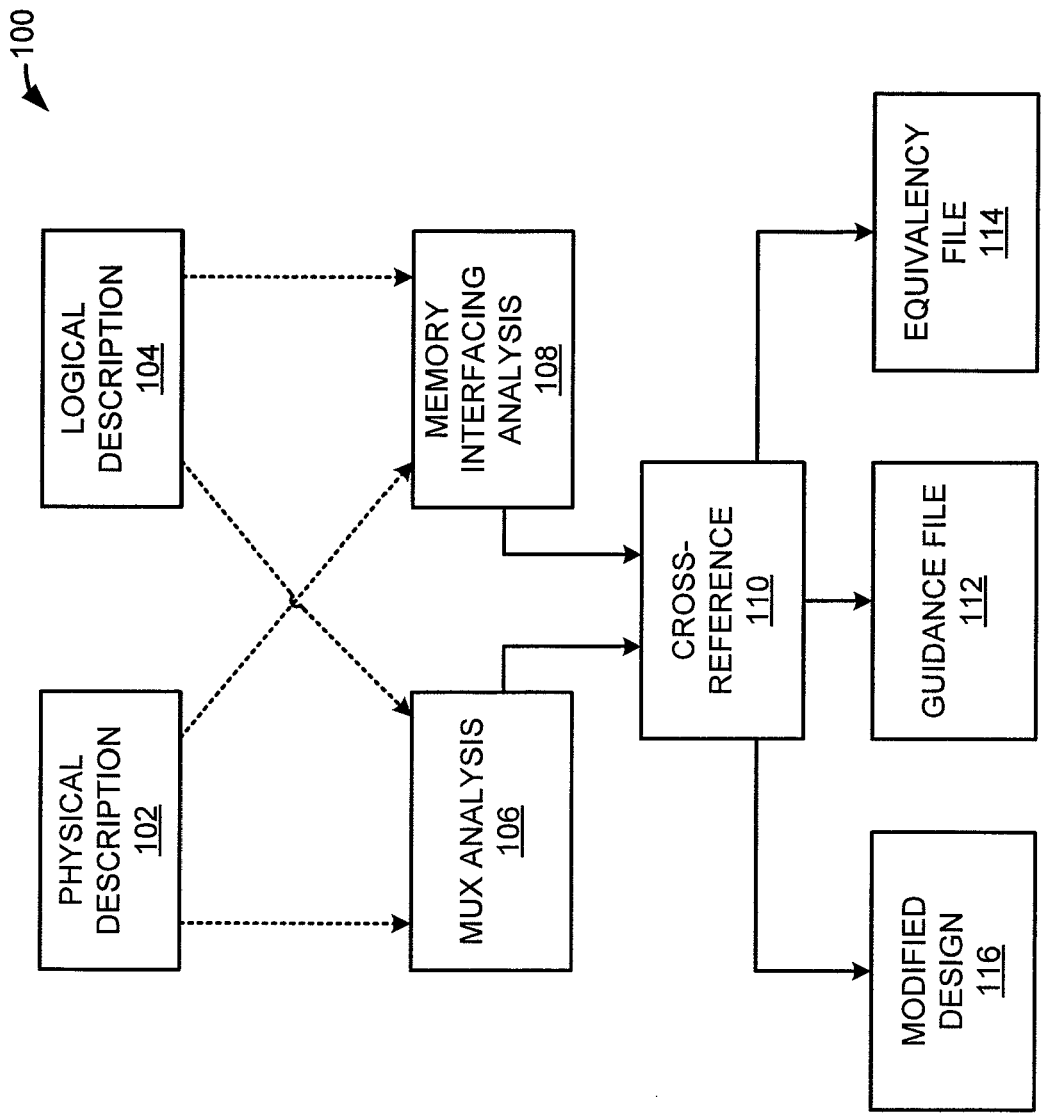
FIG. 1 is a block diagram of a system that replicates control signal sources.

FIG. 1 is a block diagram of a system that replicates control signal sources. Control source replicating system 100, or one or more elements of control source replicating system 100 may be implemented on a computer. Instructions for implementing control source replicating system 100, or any element of control source replicating system 100, may be stored on a computer readable medium.

Control source replicating system 100 comprises: physical description 102; logical description 104; MUX analysis 106; memory interfacing analysis 108; cross-reference 110; guidance file 112; equivalency file 114; and modified design 116. A physical description 102 of a block may be received by one or more multiplexer (MUX) analysis 106 tools. The physical description 102 of a block may be received by one or more memory interfacing analysis 108 tools. A logical description 104 of a block may be received by the one or more MUX analysis 106 tools. The logical description 104 of a block may be received by one or more memory interfacing analysis 108 tools. These inputs of a physical description 102 or a logical description 104 may be received by MUX analysis 106 tools and memory interfacing analysis 108 tools in various combinations and in various orders. Thus, the arrows between physical description 102 and logical description 104, and MUX analysis 106 tools and memory interfacing analysis 108 tools, are shown as dotted lines.

An output of MUX analysis 106 is input to cross-reference 110. An output of memory interfacing analysis is input to cross-reference 110. An output of cross-reference 110 may be guidance file 112. An output of cross-reference 110 may be equivalency file 114. An output of cross-reference 110 may be a modified design 116.

MUX analysis 106 may comprise a comprehensive MUX structure analysis. This MUX structure analysis may be performed at the register transfer language (RTL) level. The MUX structure analysis may also be performed at a netlist level. The MUX structure analysis may include information regarding physical properties of a layout such as modeled signal capacitance, signal resistance, or other properties derived from a physical design. Performing the MUX structure analysis at the RTL level helps detect all of the MUX structures in the design. It also helps determine which MUX structures share control sources. It also helps determine a timing budget that the control paths driven by these control sources should meet.

Memory interfacing analysis 108 may comprise a comprehensive memory interfacing analysis. This memory interfacing analysis may be performed at the RTL level. The memory interfacing analysis may also be performed at the netlist level. The memory interfacing analysis may include information regarding physical properties of a layout such as modeled signal capacitance, signal resistance, or other properties derived from a physical design. Performing the memory interfacing analysis at the RTL level helps detect all of the memories in the design. It also helps determine which memories share control sources. It also helps determine a timing budget that the control paths driven by these control sources should meet.

As used herein, the term memory should be understood to include more than memory array blocks. In particular, the term memory should be understood to refer to any relatively large block with a generally fixed shape and generally fixed input and output connection points. Microprocessor core blocks, network core blocks, interface blocks, digital signal processor blocks, RAM, ROM, programmable logic arrays (PLAs), and latch based memories are examples of relatively large blocks with a generally fixed shape that are encompassed by the term memory or memories as used herein.

Cross-reference 110 takes one or more inputs from MUX analysis 106 and memory interfacing analysis 108 and identifies scenarios where one or more MUX structures and/or one or more memories share a control source. Cross-reference 110 may utilize physical design information (e.g., physical memory locations, physical areas where MUX structure logic tends to be placed, MUX control timing reports, and/or memory control timing reports) to create guidance file 112, modified design 116, or equivalency file 114. Guidance file 112 may indicate which control sources need to be replicated. Guidance file 112 may indicate how many copies of each replicated control source should be generated. Guidance file 112 may indicate which blocks receiving the control signal from the original control source should receive which control signals from the newly replicated control sources (i.e., load partitioning).

Cross-reference 110 may utilize logical design information (e.g., number of endpoints that a control source is connected to, logical location of those endpoints, the timing budgets for the signal paths to those endpoints, and/or a user specified option indicating how many and what type of MUX structures and/or memories a control source may drive) to create guidance file 112, modified design 116, or equivalency file 114.

Cross-reference 110 may generate modified design 116. Modified design 116 may comprise replicated control sources. Modified design 116 may comprise modifications to physical description 102. Modified design 116 may comprise modifications to logical description 104. Modified design 116 may comprise modifications to an RTL level description. Modified design 116 may comprise modifications to a gate-level netlist.

Cross-reference 110 may generate guidance file 112. Guidance file 112 may comprise indications of which signals are connected to multiple MUX's, multiple memories, or a combination of a MUX and a memory. Guidance file 112 may also comprise indicators of which of control signals cross-reference 110 is recommending be replicated. Equivalency file may contain indicators that replicated control signals are verified to collectively function the same as the original control signal.

Control source replicating system 100 takes a proactive approach to finding and fixing congestion and timing issues associated with MUX structures and memories. Control source replicating system 100 leverages comprehensive MUX structure and memory analysis at both the RTL and gate-level netlist stages of design. Thus, control source replicating system 100 implements a deterministic corrective action strategy instead of iterative trial and error. When physical design information is utilized by control source replicating system 100, very little, if any, manual intervention should be required to reach a design with a minimum of congestion and timing issues related to MUX structures and memories.

Figure 2:
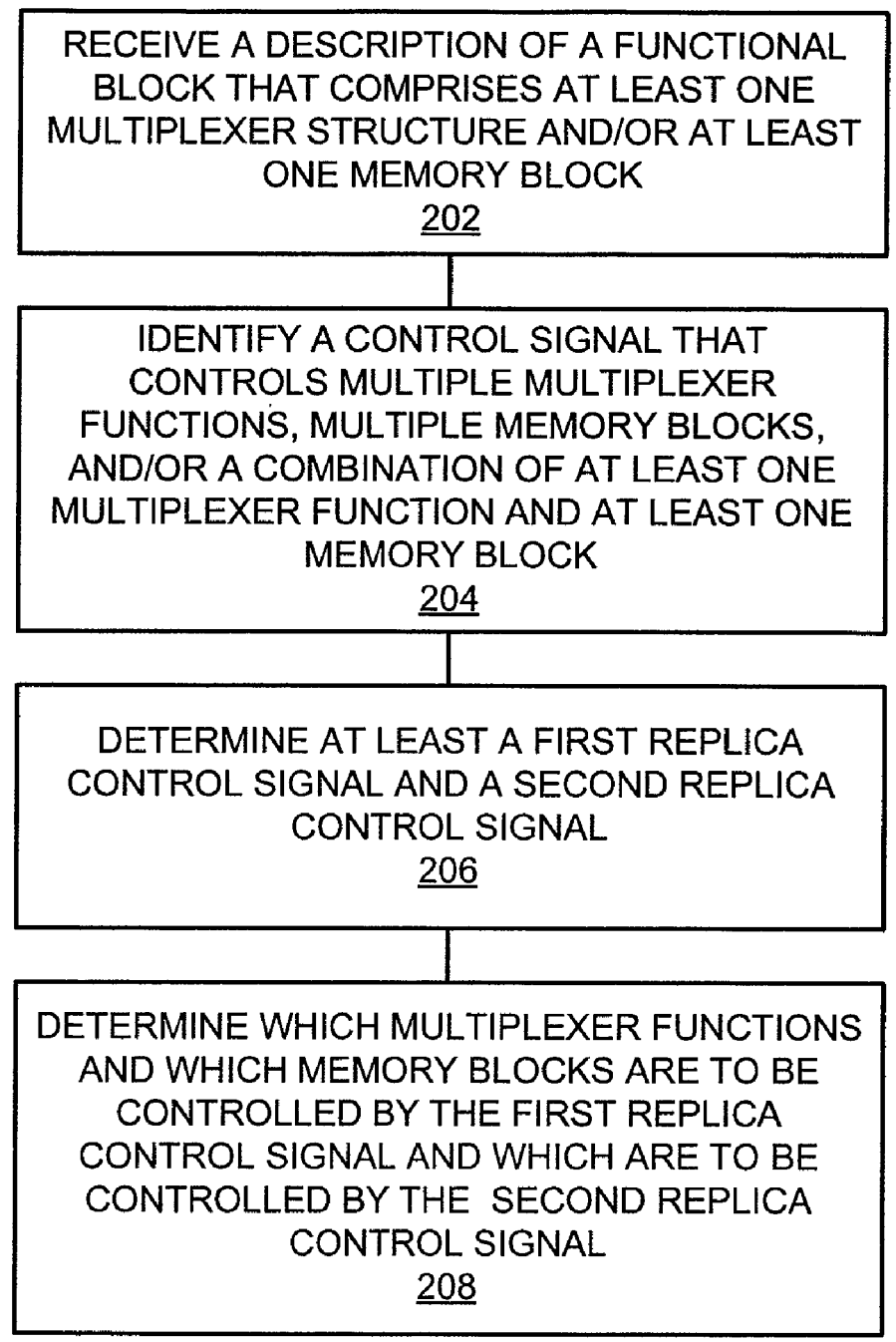
FIG. 2 is a flowchart of a method of replicating control signal sources.

FIG. 2 is a flowchart of a method of replicating control signal sources. The steps illustrated in FIG. 2 may be performed by one or more elements of control source replicating system 100.

A description of a functional block that comprises at least one multiplexer structure and/or at least one memory block is received (202). For example, MUX analysis 106 or memory interfacing analysis 108, or both, may receive a physical description 102 or a logical description 104, or both.

A control signal is identified that controls multiple multiplexer functions, multiple memory blocks, and/or a combination of at least one multiplexer function and at least one memory block (204). For example, cross-reference 110, based on at least one output of MUX analysis 106 or memory interfacing analysis 108, may identify at least one control signal that controls at least one multiplexer structure and/or at least one memory block.

At least a first replica control signal and a second replica control signal are determined (206). For example, cross-reference 110 may determine which control sources identified in block 204 need to be replicated. Cross-reference 110 may determine how many copies of each replicated control source should be generated.

Which multiplexer functions and which memory blocks are to be controlled by the first replica control signal and which are to be controlled by the second replica control signal is determined (208). For example, cross-reference 110 may determine which blocks receiving the control signal from the original control source should receive which control signals from the newly replicated control sources. The results of block 206 and/or block 208 may be indicated in guidance file 112, equivalency file 114, and/or modified design 116.

Figure 3:
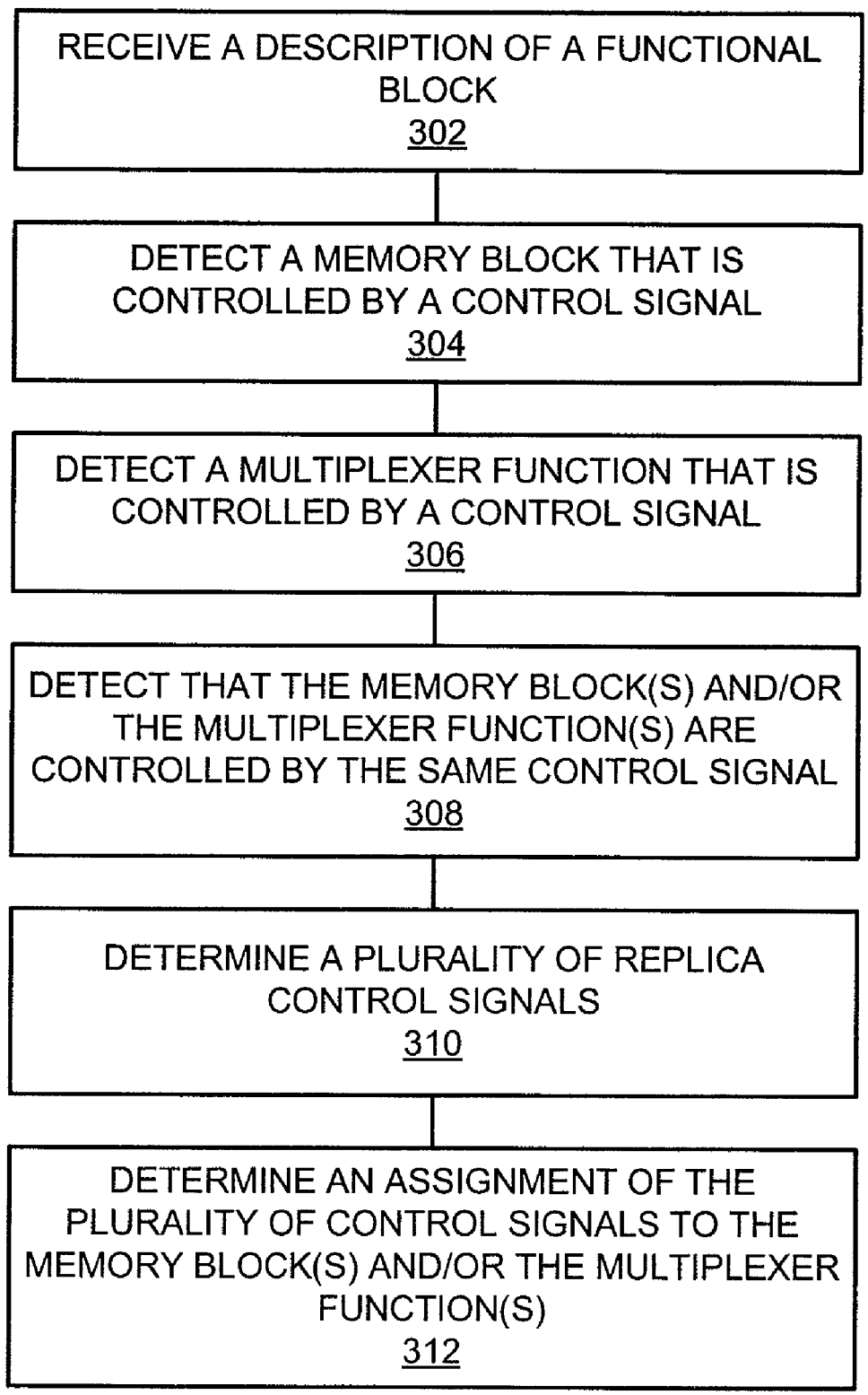
FIG. 3 is a flowchart of a method of reducing congestion and improving the timing of a control signal.

FIG. 3 is a flowchart of a method of reducing congestion and improving the timing of a control signal. The steps illustrated in FIG. 3 may be performed by one or more elements of control source replicating system 100.

A description of a functional block is received (302). For example, MUX analysis 106 or memory interfacing analysis 108, or both, may receive a physical description 102 or a logical description 104, or both. A memory block that is controlled by a control signal is detected (304). For example, memory interfacing analysis 108 may detect at least one memory block that is controlled by a control signal. A multiplexer function that is controlled by a control signal is detected (306). For example, MUX analysis 106 may detect at least one multiplexer function that shares a control signal with the memory block detected in block 304.

It is detected that the memory block(s) and/or the multiplexer function(s) are both controlled by the same control signal (308). For example, cross-reference 110 may detect that the at least one multiplexer function detected in block 306 shares a control signal with the memory block detected in block 304.

In an embodiment, no memory blocks may be detected in block 304 and multiple multiplexer functions are detected in block 306. In another embodiment, no multiplexer functions are detected in block 306 and multiple memory functions are detected in block 308. In these embodiments, it may be detected that the multiple memory blocks or multiple multiplexer functions are controlled by the control signal. For example, cross-reference 110 may detect that multiple multiplexer functions detected in block 306 share a common control signal with each other. In another example, cross-reference 110 may detect that multiple memory blocks detected in block 304 share a common control signal with each other.

A plurality of replica control signals are determined (310). For example, cross-reference 110 may determine that the control signal detected in block 308 needs to be replicated. Cross-reference 110 may determine how many copies of the control signal detected in block 308 should be generated.

An assignment of the plurality of control signals to the memory block(s) and/or the multiplexer function(s) is determined (312). For example, cross-reference 110 may determine which of the plurality of replica control signals determined in block 310 should control the multiplexer function detected in block 306 and which should control the memory block detected in block 304, or a combination thereof. The results of block 310 and/or block 312 may be indicated in guidance file 112, equivalency file 114, and/or modified design 116.

In an embodiment, the assignment of the plurality of control signals to the memory block and/or the multiplexer function may comprise assigning one of the plurality of control signals to multiple memory blocks and not to any multiplexer functions. Likewise, the assignment of the plurality of control signals to the memory block and/or the multiplexer function may comprise assigning one of the plurality of control signals to multiple multiplexer functions and not to any memory blocks. These two scenarios may apply when no memory blocks are detected in block 304 (or block 304 is skipped) or when no multiplexer functions are detected in block 304 (or block 306 is skipped).

Figure 4:
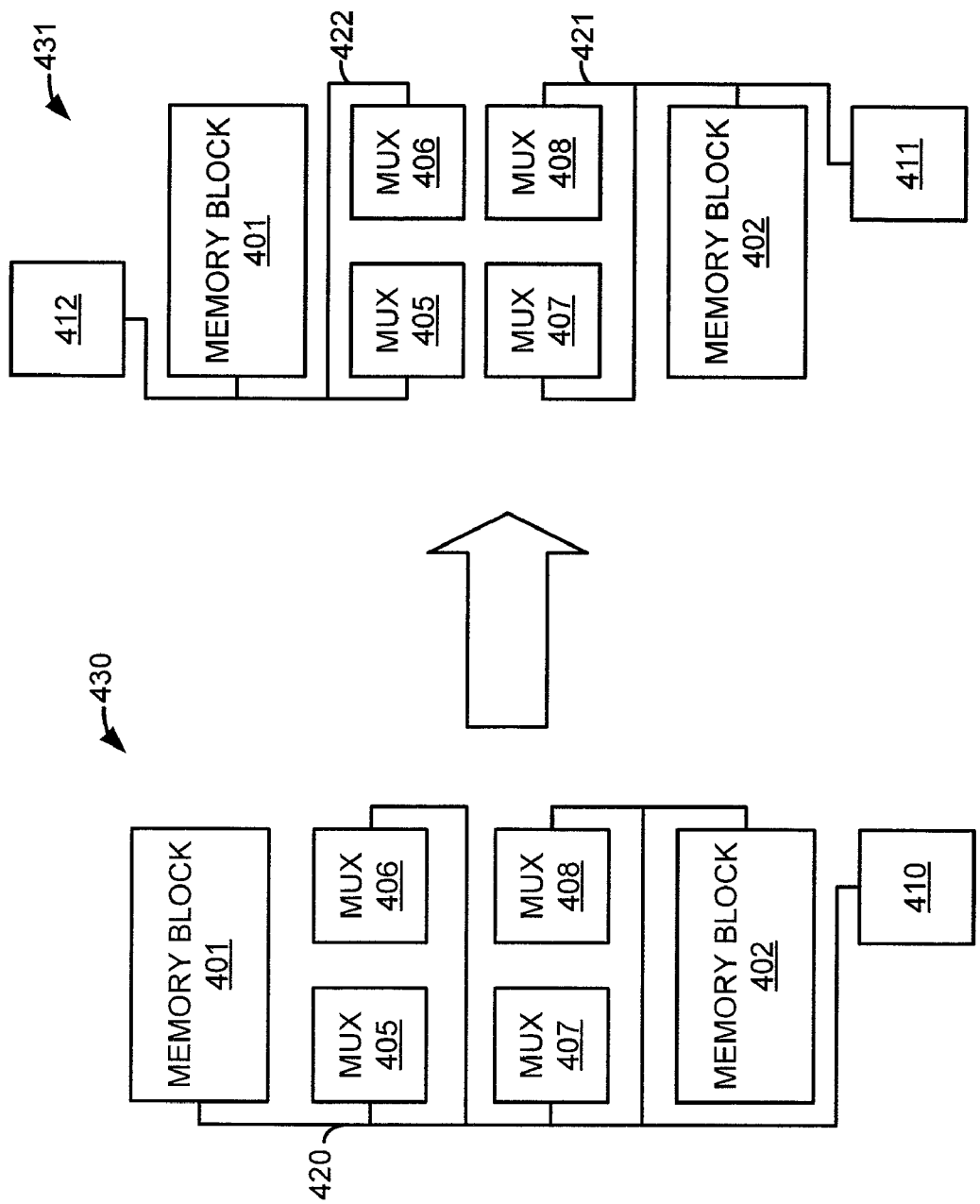
FIG. 4 is an illustration of a result of replicating a control signal source.

FIG. 4 is an illustration of a result of replicating a control signal source. In FIG. 4, an illustration of a functional block 430 with a non-replicated (original) control source is shown. Functional block 430 is comprised of memory block 401, memory block 402, and MUX's 405-408. In FIG. 4, memory block 401 is positioned above MUX 405 and MUX 406. MUX 405 and MUX 406 are positioned above MUX 407 and MUX 408, respectively. Memory block 402 is positioned below MUX 407 and MUX 408. In functional block 430, original control source 410 is positioned below memory block 402. In functional block 430, original control source 410 drives control signal 420 to memory block 401, memory block 402, MUX 405, MUX 406, MUX 407, and MUX 408. Memory block 401, MUX 405, and MUX 407 receive control signal 420 on their left sides. Memory block 402, MUX 408, and MUX 406 receive control signal 420 on their right sides.

Also in FIG. 4, an illustration of a functional block 431 with a replicated control source is shown. In functional block 431, memory block 401, memory block 402, and MUX's 405-408 are positioned as they were in functional block 430. In functional block 431, replica control source 411 is positioned below memory block 402. In functional block 431, replica control source 412 is positioned above memory block 401. Replica control source 411 drives control signal 421. Memory block 402 and MUX 408 receive control signal 421 on their right sides. Mux 407 receives control signal 421 on its left side.

Replica control source 412 drives control signal 422. Memory block 401 and MUX 405 receive control signal 422 on their left sides. Mux 406 receives control signal 422 on the right side. Thus, it can be seen that the loading on control signal 420 is greater than the loading on the replica control signals 421 and 422. It can also be seen that there is less congestion in functional block 431 than in functional block 430.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of replicating control signal sources, comprising:
    receiving a description of a functional block that comprises at least one of, a plurality of multiplexer structures, a plurality of memory blocks, and a combination of at least one multiplexer structure and at least one memory block;
    using a computer to identify a control signal that controls said at least one of, said plurality of multiplexer structures, said plurality of memory blocks, and said combination of at least one multiplexer structure and at least one memory block; and,
    determining a first replica control signal and a second replica control signal, said first replica control signal and said second replica control signal collectively functioning as said control signal to control said at least one of, said plurality of multiplexer structures, said plurality of memory blocks, and said combination of at least one multiplexer structure and at least one memory block.

2. The method of claim 1, further comprising:
    determining which of said at least one of, said plurality of multiplexer structures, said plurality of memory blocks, and said combination of at least one multiplexer structure and at least one memory block, are to be controlled by said first replica control signal.

3. The method of claim 1, wherein said step of determining a first replica control signal and a second replica control signal is based on physical design information.

4. The method of claim 3, wherein said physical design information comprises a physical location of at least one of, said at least one of said plurality of memory blocks and said at least one memory block, and a memory control timing report associated with at least one of, said at least one of said plurality of memory blocks and said at least one memory block.

5. The method of claim 3, wherein said physical design information comprises physical areas where said at least one of, said plurality of multiplexer structures and said at least one multiplexer structure tends to be located, and a multiplexer control timing report associated with said at least one of, said plurality of multiplexer structures and said at least one multiplexer structure.

6. The method of claim 3, wherein said physical design information comprises a physical location of said at least one memory block and physical areas where said at least one multiplexer structure tends to be located.

7. The method of claim 1, wherein said step of determining a first replica control signal and a second replica control signal is based on logical design information.

8. The method of claim 7, wherein said logical design information comprises a number of loads that said control signal drives.

9. The method of claim 7, wherein said logical design information comprises a user specified maximum for a number of loads that said control signal is to be allowed to drive.

10. A method of reducing congestion and improving timing of a control signal, comprising:
- receiving a description of a functional block;
- using a computer to detect, in said functional block, a memory block that is controlled by said control signal;
- detecting, in said functional block, a multiplexer structure that is controlled by said control signal;
- detecting that said memory block and said multiplexer structure are both controlled by said control signal;
- determining a plurality of replica control sources comprising a first replica control source and a second replica control source; and,
- determining an assignment of said plurality of replica control sources to said memory block and said multiplexer structure comprising assigning said first replica control source to control said memory block and assigning said second replica control source to control said multiplexer structure.

11. The method of claim 10, wherein said steps of determining a plurality of replica control sources and determining an assignment of said plurality of replica control sources is based on physical design information.

12. The method of claim 11, wherein said physical design information comprises a physical location of said memory block and a memory control timing report associated with said memory block.

13. The method of claim 11, wherein said physical design information comprises physical areas where said multiplexer structure tends to be located and a multiplexer control timing report associated with said multiplexer structure.

14. The method of claim 11, wherein said physical design information comprises a physical location of said memory block, a memory control timing report associated with said memory block, physical areas where said multiplexer structure tends to be located, and a multiplexer control timing report associated with said multiplexer structure.

15. The method of claim 10, wherein said steps of determining a plurality of replica control sources and determining an assignment of said plurality of replica control sources is based on logical design information.

16. The method of claim 15, wherein said logical design information comprises a number of loads that said control signal drives.

17. A non-transitory computer readable medium having instructions stored thereon for replicating a control source that, when executed by a computer, at least direct the computer to:
- receive a description of a functional block that comprises at least one multiplexer structure and at least one memory block;
- identify a control signal that controls said at least one multiplexer structure and said at least one memory block; and,
- determine a first replica control signal and a second replica control signal, said first replica control signal and said second replica control signal collectively functioning as said control signal to control said at least one multiplexer structure and said at least one memory block.

18. The computer readable medium of claim 17, wherein the computer is further directed to:
- determine which of said at least one multiplexer structure and said at least one memory block are to be controlled by said first replica control signal.

19. The computer readable medium of claim 18, wherein said description of a functional block is at least one of a register transfer language description and a gate-level netlist.

20. The computer readable medium of claim 18, the computer is further directed to:
- verify that said first replica control signal and said second replica control signal collectively function to control said at least one multiplexer structure and said at least one memory block equivalent to said control signal.

* * * * *